March 29, 1960     L. J. B. LA COSTE     2,930,138
LEVELING DEVICE FOR INDICATING UNITS
Filed June 16, 1955     2 Sheets-Sheet 1
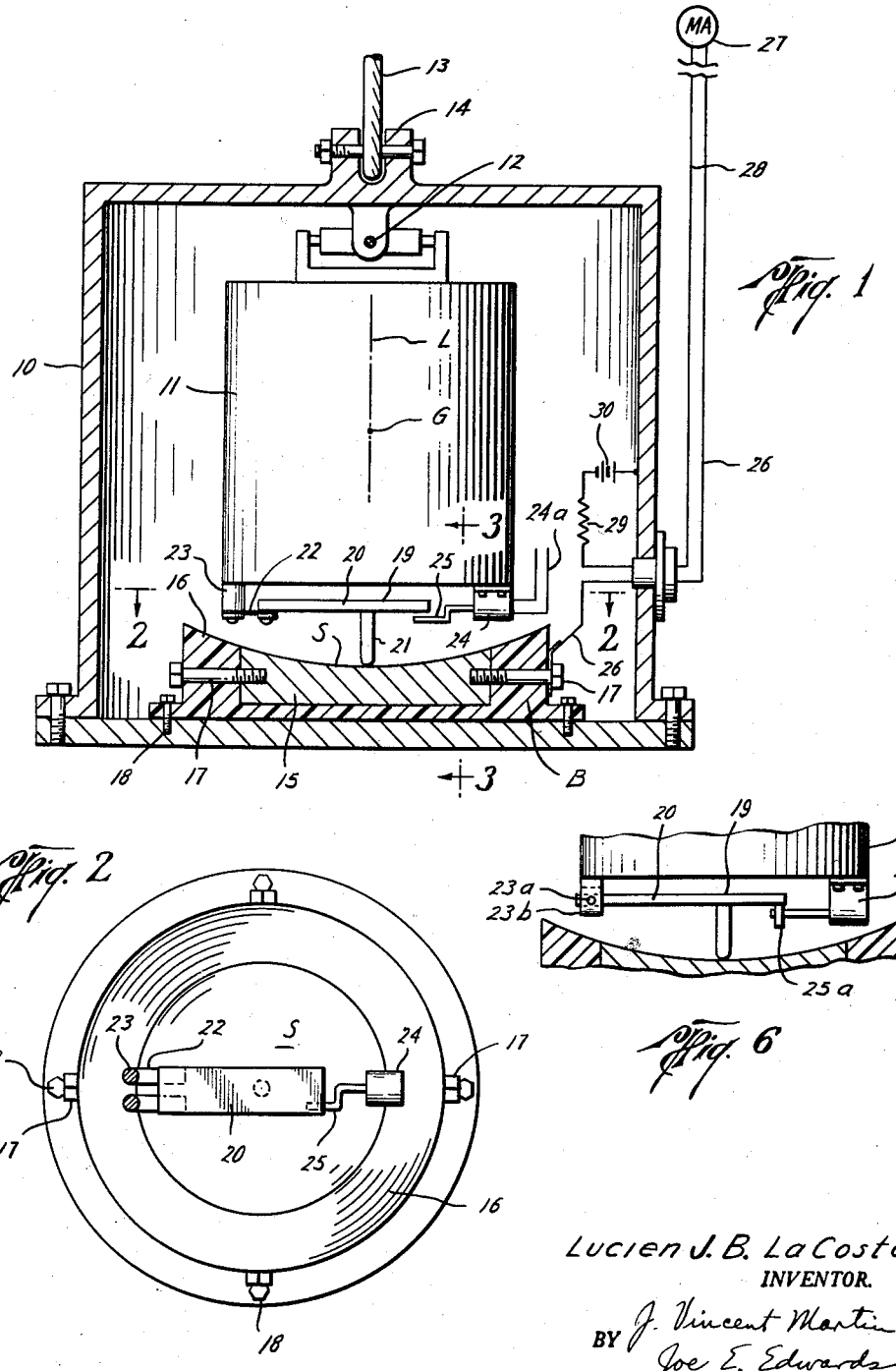
Lucien J. B. LaCoste
INVENTOR.
BY J. Vincent Martin
Joe E. Edwards
B. R. Pravel
ATTORNEYS March 29, 1960  L. J. B. LA COSTE  2,930,138
LEVELING DEVICE FOR INDICATING UNITS
Filed June 16, 1955  2 Sheets-Sheet 2
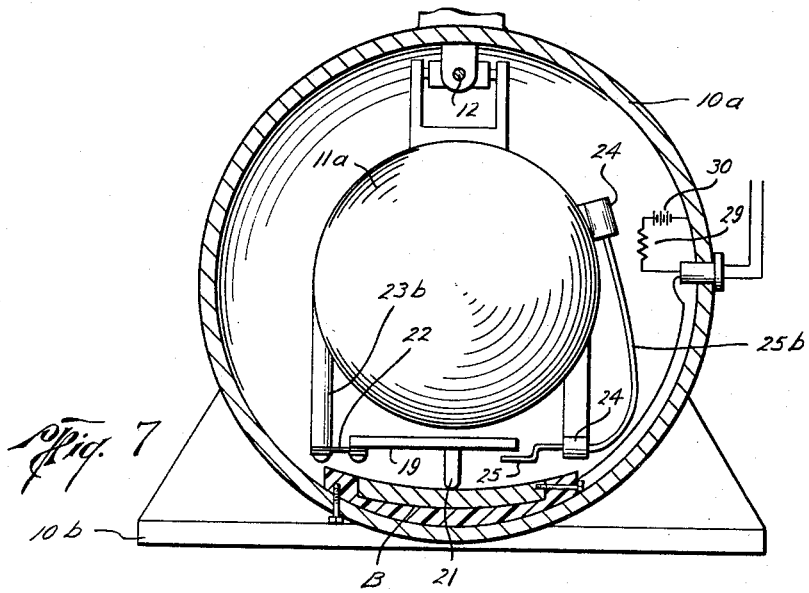
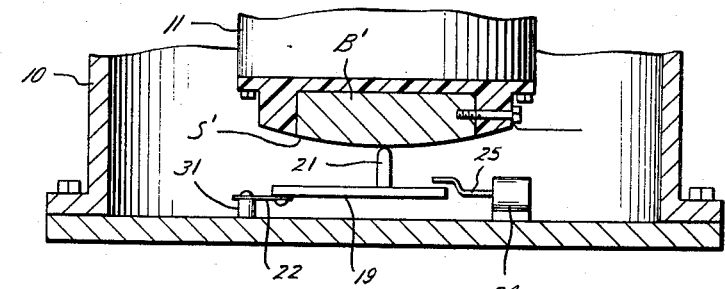
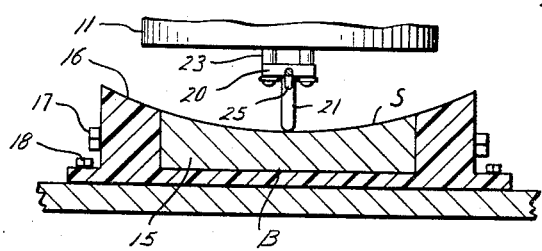
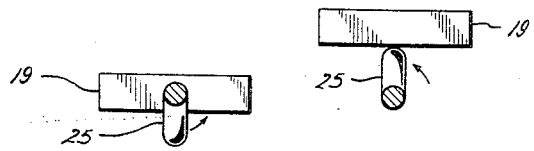
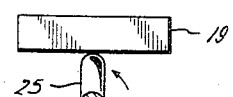
Lucien J. B. La Coste
INVENTOR.
BY J. Vincent Martin
Joe E. Edwards
B. R. Pravel
ATTORNEYS United States Patent Office 2,930,138
Patented Mar. 29, 1960

2,930,138

LEVELING DEVICE FOR INDICATING UNITS

Lucien J. B. La Coste, Austin, Tex., assignor to La Coste & Romberg, Austin, Tex., a partnership Application June 16, 1955, Serial No. 515,995

2 Claims. (Cl. 33—220)

This invention relates to new and useful improvements in leveling devices for indicating units, such as gravity meters.

It has been the practice in some instances to suspend a gravity meter within its outer housing by means of a gimbal or universal joint and the accuracy of the meter is dependent upon the force of gravity bringing the instrument to a truly level position. Obviously, the use of low friction bearings in the gimbal or universal joint together with the disposition of the center of gravity of the instrument well below the joint will assure accurate leveling of the meter. However, the use of the low friction bearings makes the suspension extremely sensitive to swinging motion and therefore, some means for damping oscillations of the gravity meter about the gimbal joint must be provided.

Liquid has been found satisfactory for damping, but the use of liquid presents certain disadvantages since it is somewhat difficult to handle and also involves leakage problems. If an attempt is made to employ a constant solid friction for the purpose of applying a force which resists the unimpeded or free swinging of the meter, such constant solid friction will function to reduce the tendency of the meter to oscillate but at the same time, it will interfere with the accuracy of the unit because it may prevent the meter from settling to an exactly level position. For this reason, the use of a continuous friction at some point in the suspension mounting is undesirable.

It is one object of this invention to provide an improved leveling device which is particularly applicable to a gravity meter and which is constructed to effectively damp the oscillations of a sensitively suspended unit, whereby accuracy of indication by said unit is assured.

Another object is to provide an improved leveling device which does not employ a constant solid friction in its suspension mounting or which does not require the use of a damping liquid, whereby the disadvantages incidental to these previous known methods are obviated.

An important object of the invention is to provide a leveling device for a universally mounted unit wherein a frictional force which resists swinging movement of the unit is intermittently applied to the unit, whereby the oscillations of said unit are effectively damped during the period when the frictional force is applied but said unit is completely free to move into level position during the intervals when the frictional force is absent; the arrangement assuring efficient damping, while permitting the unit to be sensitively suspended or mounted to assure accurate leveling by the force of gravity.

Another object is to provide a leveling device, of the character described, wherein the intermittent frictional force is applied in such manner that the gravity meter or other universally mounted unit is not shaken or moved to an unlevel position, whereby the accuracy of the unit is not affected by the application of such force.

A particular object is to apply an intermittent frictional force, which may be controlled as to time interval, to the suspended unit in a direction toward the means which suspends the unit or preferably to compensate for play in the bearings, along a line which is substantially co-extensive with a line passing through the effective center of the suspension mounting of the unit and through the center of gravity of said unit whereby the application of said force will not tend to move the unit to an unlevel position; said applied force being applied a distance from the suspension mounting and being relatively small to eliminate the possibility of shaking the suspended unit and interfering with the accuracy of the operation of the unit.

Another object is to provide a leveling device, of the character described, having means for indicating a condition where the gravity meter or other suspended unit is engaged with the side of the outer casing or housing in which the unit is suspended to thereby indicate that the attainment of a truly level position of the unit is being interfered with by said outer casing or housing.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a vertical, sectional view of a leveling device, constructed in accordance with the invention, and illustrating the same applied to a gravity meter, Figure 2 is a horizontal, cross-sectional view, taken on the line 2—2 of Figure 1, Figure 3 is a transverse, sectional view, taken on the line 3—3 of Figure 1, Figures 4 and 5 are diagrammatic views illustrating the action of the crank member which reciprocates the force-applying element, Figure 6 is a partial sectional view of a modified mounting for the force-applying element, Figure 7 is a view, similar to Figure 1, of a modified form of the invention, and Figure 8 is a partial, sectional view of still another form of the invention.

In the drawings the numeral 10 designates an outer housing which is preferably watertight, within which a gravity meter 11 is mounted. The gravity meter may be of any desired construction, and is suspended within the housing for universal movement therein by means of the well-known gimbal or universal joint 12. Where the gravity meter readings are being taken below the surface of the water, such as on the floor of the ocean, the housing 10 is adapted to be lowered to the ocean floor by means of a suitable cable 13, which is attached to ears 14 provided in the top of said housing.

As is well known, the gravity meter must be in a truly level position in order to produce accurate indications or readings, and it is therefore desirable to mount the meter on a sensitive suspension; for this reason, the gimbal or universal joint is constructed with minimum friction whereby the suspended meter is extremely responsive to the gravitational force which brings it to a level position. Where the gimbal or universal joint 12 is made to provide extreme sensitivity, the tendency of the gravity meter to oscillate is increased, and therefore some means must be provided to dampen the oscillation.

In carrying out the present invention, a generally circular block member B is disposed within the lower portion of the housing 10 below the gravity meter 11. The member B is constructed of a central circular portion 15, which is of an electrical conducting material, and an outer annular portion 16 which is constructed of electrical non-conducting material; the portions 15 and 16 are secured together by screws 17, while the portion 16 is attached to the bottom of the housing by screws 18. The upper surfaces of the portions 15 and 16 are formed to provide a generally spherical, concave surface S, the center of which is substantially on the effective center of rotation of the gimbal or universal joint 12.

The surface S of the member B is adapted to coact with a frictional force-applying element 19, which consists of a lateral arm 20 and a depending extension or rod 21, the lower end of said rod being rounded and arranged to engage the surface S. The arm 20 has one end attached to leaf springs 22, and the opposite ends of the springs are attached to suitable supports 23 which extend downwardly from the lower end of the gravity meter 11. With this arrangement, the lateral arm 20 is carried by the gravity meter and is in effect pivoted on a horizontal axis, whereby the outer or free end of the arm may be moved about such horizontal axis. When the arm is swung, it is evident that its extension or rod 21 will be moved with respect to the concave surface S of the member B. In most instances there is some play in the bearings of the suspension and in order to prevent the engagement of the rod or extension 21 with the surface S from causing the gravity meter to be moved laterally, it is desirable that the rod be mounted on a line L, which extends through the effective center of rotation of the gimbal joint 12 and also through the center of gravity, which is indicated at G, of the gravity meter. By so locating the rod or extension, the downward movement thereof into engagement with the concave surface will not tend to shift the gravity meter laterally, and therefore will not interfere with accurate leveling of the meter. Where the bearings of the suspension mounting are substantially perfect with no undue play, it is only necessary to apply the force in a direction toward said suspension mounting.

In order to apply the frictional force of the extension or rod 21 between the gravity meter and the housing in an intermittent manner, the force-applying member 19 is adapted to be reciprocated so that the arm 20 is alternately lowered and raised with respect to the surface S. This is accomplished by an electric motor 24, which is mounted on the underside of the gravity meter 11. A crank 25 is secured to the motor shaft, and it will be evident that as said crank rotates it engages the underside of arm 20 and functions to alternately swing the arm about its horizontal axis (Figures 4 and 5), so that the rod or extension 21 is alternately engaged or disengaged with the concave surface S. In operation the motor is run continuously so that an intermittent application of friction between the unit 11 and the housing 10 is effected. It is noted that, although the crank arm 25 is illustrated in Figure 1, a suitable cam 25a, as shown in Figure 6, could be employed. Also, the use of the leaf springs 22 is not essential to the invention, since one end of the arm 20 of force-applying member 19 could be pivoted as indicated at 23a on suitable ears 23b provided on the lower end of the gravity meter 11. This modified structure is also illustrated in Figure 6.

In the operation of the intermittent frictional force-applying means, the assembly is lowered into position at which the reading is to be taken and the meter 11, being responsive to gravitational force, will seek a level position. The motor 24 may then be operated and electrical current may be connected thereto through electrical conductors 24a, which may extend upwardly to the surface through a suitable cable when the readings are being taken below the surface of the water. As the motor operates, the crank 25 is rotated to reciprocate the arm 20 about its horizontal axis, and this results in the extension or rod 21 being alternately engaged with and disengaged from the concave surface S. During the time that the rod 21 engages the surface S, the frictional contact between the rod and the surface applies or exerts a solid friction between the gravity meter 11 and the housing, which friction would substantially prevent any swinging movement of the meter. When the rod or extension is out of contact with the surface S, the meter is completely free to seek its level, and thus it is apparent that the application of intermittent frictional force will effectively damp any tendency of the meter to oscillate.

It is noted that the force required to be exerted by the engagement of the rod with the concave surface is relatively small because the point of applied force is remote from the center of the gimbal or universal joints. Thus the application of friction at a point remote from the gimbal joint eliminates the possibility of the force application imparting a shaking motion to the gravity meter. It has also been found that by arranging the crank 25 or the cam 25a in the desired manner, the time of contact of the rod or extension with the surface is long as compared to the time of disengagement of the rod from said surface. By properly timing the period of contact as compared to the period of disengagement, it is possible to employ the intermittent friction without any noticeable shaking or displacement of the gravity meter. Therefore the meter is sensitively responsive to gravitational force so that it will seek its level position and the particular damping device will damp any oscillations of the meter.

Under certain conditions it is possible that the housing 10 may be inclined to such a degree on the ocean floor that the gravity meter may be swung to a position within the housing where said meter engages the wall of the housing. Obviously, in such a case, an inaccurate reading might be obtained, and it is desirable to indicate when such conditions occur. It is for this purpose that the central portion 15 of the member B is constructed of an electrical conducting material, while the peripheral portion 16 is constructed of an insulated or electrical non-conducting material. An electrical conductor 26 has an electrical connection through one of the screws 17 with the central portion 15 of the member B, and this conductor extends upwardly to the surface and is connected to a milliammeter 27 which is located at a point remote from the housing; in the case of water operations, it would be located aboard the boat or other craft. A second electrical conductor 28 is also connected to the milliammeter and has connection through a resistance 29 and battery 30 with the wall of the outer housing 10. The circuit is completed through the housing wall, gimbal joint 12, casing of the gravity meter 11 and force-applying member 19. Thus, when the extension or rod 21 of the force-applying member is in engagement with the central portion 15 of the member B, a circuit is completed and an indication will be given on the milliammeter 27. Therefore, during the normal operation when the force-applying element 19 is reciprocating, an intermittent deflection of the milliammeter 27 will occur. Such intermittent deflection will provide the operator with an indication that the gravity meter 11 is in such position with relation to its outer housing that accurate readings are being obtained.

In the event that the outer housing 10 is inclined to the point where the gravity meter 11 will engage the wall of the housing, the rod or extension 21 of the force-applying element 19 will move into contact with the insulated portion 16 of the member B, and at such time the electrical circuit to the milliammeter 27 will not be complete. The absence of the intermittent deflection of the milliammeter 27 will indicate to the operator that the gravity meter 11 has moved into engagement with the wall of its outer housing, and the operator is thus advised that inaccurate readings are being obtained.

As has been noted, the gravity meter 11 may be of any suitable construction and may be housed in any type of casing; also, the particular shape of the outer housing is subject to variation. In Figure 7 a modified form of the invention is shown wherein a spherical outer housing 10a is provided. The gravity meter 11a is disposed within a spherical casing and is suspended upon the gimbal or universal joint 12. A base plate 10b is secured to the outer casing and forms a base on which said housing rests when it is lowered into position during operation of the device.

The force-applying element 19 and the co-acting block member B are of substantially the same construction as in the first form of the invention heretofore described; however, in the modification, the supporting leaf springs 22 are secured to a depending arm 23b. Also, an electrical motor 24 is mounted at one side of the casing of the gravity meter 11a and is connected through a flexible drive cable 25b with the crank 25. The operation of this form of the invention is exactly the same as heretofore described.

It has been pointed out that it is desirable that the extension or rod 21 be movable in substantially the line which extends through the effective center of rotation of the gimbal joint and through the center of gravity of the gravity meter. However, because the arm is in effect pivoted on a horizontal axis the lower end of the rod or extension 21 will move slightly out of this line or path. Practice has shown that this slight misalignment does not affect efficient operation. If it is desired to cause the extension or rod to travel exactly along the line through the center of the gimbal joint and the center of gravity, a suitable well-known parallel linkage may be employed in place of the hinged mounting of said rod or extension; or the rod or extension could be in the form of a plunger carried in a suitable cylinder on the lower end of the gravity meter and a suitable connection between the crank and plunger to cause reciprocation of the plunger could be employed.

The invention contemplates a reversal of the positions of the force-applying member 19 and the block member B, and in Figure 8 such reversal of parts is shown. In this instance the force-applying member 19 has its leaf springs 22 secured to a support 31 on the bottom of the outer housing 10. The electric motor 24 and its crank 25 are also mounted on the outer housing. The extension or rod 21 of the force-applying member 19 extends upwardly instead of downwardly.

In place of the block member B, a block member B', which has a convex surface S', as distinguished from the concave surface S of block B, is secured to the bottom of the gravity meter 11. Obviously, the intermittent frictional force is applied in substantially the same manner when the force-applying element is reciprocated by the crank 25 of the motor 24. The block member B' of the form shown in Figure 8 may also have the electrical conducting central portion and the peripheral insulated portion so that an indication of the gravity meter being in a position in engagement with the wall of the outer housing may be obtained.

The device has been described herein as applied to a gravity meter which is suspended by means of a universal joint for movement in all directions. However, it is evident that the intermittent force-applying device could be employed with a pivotally suspended member arranged to swing in only a single plane. It is evident that in such case, the application of intermittent frictional force would damp the oscillation of such pivotally suspended member.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A leveling device for a gravity meter including, an outer housing, a gravity meter within the housing, a gimbal joint for supporting the meter within the housing for universal movement therein, a concave surface within the housing below the gravity meter, said surface being a portion of a sphere the center of which is at the effective center of rotation of said gimbal joint, a force-applying element mounted on the gravity meter and movable into and out of contact with the concave surface, means for intermittently imparting movement to said element to cause said element to alternately engage and disengage said surface, said concave surface having its central portion constructed of electrical conducting material and its peripheral portion of electrical non-conducting material, said force-applying element also being constructed of electrical conducting material whereby when said element engages the central portion of said surface electrical contact is made therebetween, and electrical indicating means electrically connected with the force-applying element and the electrical conducting portion of said surface for indicating the engagement of said element with said surface.

2. A leveling device for a gravity meter including, an outer housing, a gravity meter within the housing, a gimbal joint for supporting the meter within the housing for universal movement therein, a concave surface within the housing below the gravity meter, said surface being a portion of a sphere the center of which is at the effective center of rotation of said gimbal joint, a force-applying element mounted on the gravity meter and movable into and out of contact with the concave surface, means for intermittently imparting movement to said element to cause said element to alternately engage and disengage said surface, said concave surface having its central portion constructed of electrical conducting material and its peripheral portion of electrical non-conducting material, said force-applying element also being constructed of electrical conducting material whereby when said element engages the central portion of said surface electrical contact is made therebetween, and electrical indicating means electrically connected with the force-applying element and the electrical conducting portion of said surface for indicating the engagement of said element with said surface, the peripheral non-conducting portion of said surface being so located that the force-applying element engages said peripheral portion when the gravity meter is contacting the wall of the housing.

References Cited in the file of this patent

UNITED STATES PATENTS

| 1,055,153 | Ferguson | Mar. 4, 1913 |
| 1,200,899 | Stewart | Oct. 10, 1916 |
| 2,252,338 | Alkan | Aug. 12, 1941 |

FOREIGN PATENTS

| 3,644 | Great Britain | Jan. 30, 1813 |
| 341,756 | Germany | Oct. 7, 1921 |
| 508,034 | Germany | Sept. 23, 1930 |